No. 717,179. Patented Dec. 30, 1902.
J. EMANUEL.
HOOF NIPPERS.
(Application filed Aug. 10, 1901.)

(No Model.)

Witnesses:
Cyrus A. Anthony
John L. Funk

Inventor:
John Emanuel

UNITED STATES PATENT OFFICE.

JOHN EMANUEL, OF BEDISON, MISSOURI, ASSIGNOR OF ONE-FOURTH TO WILLIAM G. SCHANCKE, OF REDDING, IOWA.

HOOF-NIPPER.

SPECIFICATION forming part of Letters Patent No. 717,179, dated December 30, 1902.

Application filed August 10, 1901. Serial No. 71,671. (No model.)

*To all whom it may concern:*

Be it known that I, JOHN EMANUEL, a citizen of the United States, residing at Bedison, in the county of Nodaway and State of Missouri, have invented certain new and useful Improvements in Hoof-Nippers; and I do hereby declare the following to be a full, clear, and exact description of the invention, such as will enable others skilled in the art to which it appertains to make and use the same.

This invention provides an implement of novel construction especially adapted for trimming the hoof of horses' feet and which is equally well adapted for dehorning cattle and for cutting purposes generally requiring the application of considerable force for bringing the movable cutter into active play.

The invention consists, essentially, of the structural features and novel details and combinations of the parts, which hereinafter will be more particularly set forth, illustrated, and finally claimed.

Figure 1:
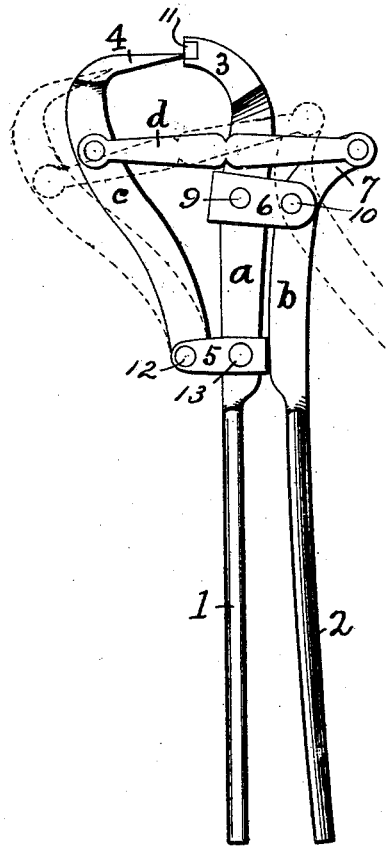
Figure 2:
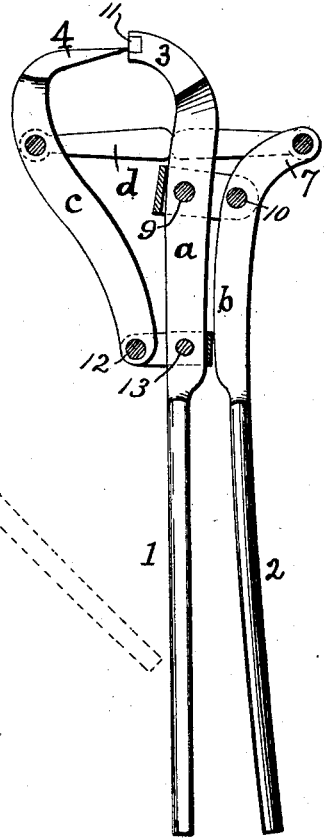
Figure 3:
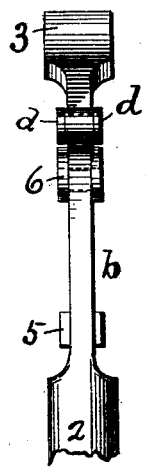

In the drawings hereto attached and forming a part of the specification, Figure 1 is a side view of a tool embodying the invention, the dotted lines showing the cutter and its actuated lever open and the full lines showing the said parts closed. Fig. 2 is a view similar to Fig. 1, showing the connections in section and the rear link omitted. Fig. 3 is a front view of the head or upper portion of the tool.

Corresponding and like parts are referred to in the following description and indicated in all the views of the drawings by the same reference characters.

In its structural organization the tool comprises members $a$ and $b$, having handle portions 1 and 2 and loosely connected by means of a yoke 6, embracing opposite sides of said members and pivotally connected thereto, as shown at 9 and 10. The member $a$ is relatively fixed and is provided with a curved end 3, having embedded in its extremity a block 11, of brass or like material, to form a bed for the edge of the cutter 4, so as to prevent injury thereto. A cutter member $c$ is loosely connected with the member $a$ by means of a yoke 5, having pivotal connection with said parts $c$ and $a$, as shown at 12 and 13. The pivoted member $c$ terminates in a cutter 4 for coöperation with the end 3 of the member $a$. The member $c$, by reason of its loose connection 5 with the member $a$, is adapted to have a limited longitudinal movement in addition to its pivotal movement upon the pin 12, thereby admitting of properly and conveniently positioning the cutter when applying the tool to the hoof or other part to be cut. The member $b$ constitutes an operating-lever, and its end portion 7 extended beyond the pivot 10 is curved away from the member $a$, as shown at 7, and links $d$ connect the extremity of the curved end 7 with the pivoted member $c$ a short distance from the cutter 4. The links $d$ embrace opposite sides of the members $a$, $b$, and $c$, thereby equalizing the strain upon opposite sides of the tool and obviating torsional strain upon the several connections. By having the end 7 curved away from the member $a$ provision is had for free pivotal movement of the operating-lever, as shown by the dotted lines in Fig. 1. The yoke 6 admits of the operating-lever $b$ having a limited longitudinal play in addition to its pivotal movement upon the pin 10, this being of great advantage in the practical operation of the tool.

By having the cutter member $c$ pivoted to the fixed member $a$ and the operating-lever $b$ pivoted to the said member $a$ and connected to the member $c$ in the manner herein specified a comparatively light force applied to the operating-lever is transferred into considerable force for effectively operating the cutter 4 on the work, such as trimming of horses' hoofs, dehorning cattle, or cutting any part desired.

Having thus described the invention, what is claimed as new is—

The herein-described tool for the purposes specified comprising a fixed member having a curved end provided with a bed-piece, a pivoted member having a cutter for coöperation with the bed-piece of the fixed member, a yoke having pivotal connection with the fixed and pivoted members, an operating-lever having its end portion curved away from the fixed member, a yoke having pivotal connection with the operating-lever and the fixed member, and links pivotally connected with the curved end of the operating-lever and with the said pivoted member, the parts being constructed to admit of both pivotal and longitudinal play of the operating-lever and pivoted cutter member, substantially as set forth.

In testimony whereof I have signed my name to this specification in the presence of two subscribing witnesses.

JOHN EMANUEL.

Witnesses:
  J. L. FUNK,
  JNO. M. DUNCAN.